United States Patent [19]

Minatono et al.

[11] 4,204,046
[45] May 20, 1980

[54] PRESSURE SENSITIVE ADHESIVE COMPOSITION

[75] Inventors: Shobu Minatono; Hideo Takamatsu; Junnosuke Yamauchi; Katsuyoshi Terao, all of Ibaragi, Japan

[73] Assignee: Kuraray Company, Limited, Kurashiki, Japan

[21] Appl. No.: 2,410

[22] Filed: Jan. 10, 1979

[30] Foreign Application Priority Data

Jan. 17, 1978 [JP] Japan .................. 53-3925

[51] Int. Cl.² ........................... C08L 51/00
[52] U.S. Cl. ......................... 525/65; 525/66; 525/68; 525/69; 525/74; 526/56
[58] Field of Search .............. 260/879, 836, 837, 829

[56] References Cited

U.S. PATENT DOCUMENTS

| | | | |
|---|---|---|---|
| 3,135,716 | 6/1964 | Uraneck | 260/879 |
| 3,177,190 | 4/1965 | Hsieh | 260/879 |
| 3,208,980 | 9/1965 | Gruver | 260/836 |
| 3,462,516 | 8/1969 | Smith | 260/879 |
| 3,635,861 | 1/1972 | Russell | 260/879 |
| 3,644,248 | 2/1972 | Lujik | 260/23.7 M |
| 3,668,279 | 6/1972 | Loveless | 260/879 |
| 3,673,274 | 6/1972 | Tomalia | 260/879 |
| 3,887,527 | 6/1975 | Okamura | 260/879 |
| 4,009,228 | 2/1977 | Tazuma | 260/879 |
| 4,080,293 | 3/1978 | Yasui | 260/879 |
| 4,108,944 | 8/1978 | Tazuma | 260/879 |

FOREIGN PATENT DOCUMENTS 2262677  9/1975  France .................. 526/56

*Primary Examiner*—Paul Lieberman
*Attorney, Agent, or Firm*—Oblon, Fisher, Spivak, McClelland & Maier

[57] ABSTRACT

A pressure-sensitive adhesive composition based on liquid rubber, a cross-linking agent therefor and a tackifier, in which the liquid rubber component is a modified low molecular weight polyisoprene which is obtainable by adding 0.03 to 7 mol % of maleic anhydride or a derivative thereof, based on each isoprene monomer unit, to a low molecular weight polyisoprene having a molecular weight in the range of 10,000 to 90,000 is useful in producing a pressure-sensitive adhesive composition having very desirable tackiness, cohesive force and bonding characteristics without use of an organic solvent or with use of only a small amount of the solvent.

11 Claims, No Drawings

PRESSURE SENSITIVE ADHESIVE COMPOSITION

BACKGROUND OF THE INVENTION

1. Field of the Invention

This invention relates to pressure-sensitive adhesive compositions. More particularly, the invention relates to a pressure-sensitive adhesive composition comprising a low molecular weight polyisoprene modified by maleic anhydride or a derivative of maleic anhydride, a cross-linking agent therefor and a tackifier.

2. Description of the Prior Art

The conventional method of manufacturing pressure-sensitive adhesive compositions for various final products such as pressure-sensitive adhesive tapes comprises dissolving a rubber-type high molecular weight polymer, a tackifier and other components in an organic solvent such as toluene, hexane or a hydrocarbon rubber-solvent to prepare a solution with a total solids content of a few percent to tens of percent, coating a backing member with the solution and drying the same to remove the organic solvent therefrom. In such a manufacturing process, the large quantity of solvent has to be removed by the drying operation which, of course, entails a significant economic loss due to the lost solvent and the thermal energy consumed. Meanwhile, government regulations on working environments and against atmospheric pollution have become increasingly rigorous and will certainly be made more stringent in the future. In view of those circumstances, it is the ultimate goal of the adhesive industry to ensure consistently high solids concentrations of the system throughout the process of manufacture of pressure-sensitive adhesive compositions or, for that matter, to provide a completely solventless system of manufacture. Such a desirable manufacturing technology cannot be established from improvements or innovations in equipment alone but requires studies and solutions from the raw material side as well. There is already disclosed in U.S. Pat. No. 3,160,595 a pressure-sensitive adhesive composition consisting of depolymerized polyisoprene rubber, p-quinonedioxime and lead dioxide but the composition is not only inadequate in cohesive force but, because of its being a depolymerized product, has of necessity been thermally discolored. A few other compositions have also been recently developed for the stated purpose but their performances are not completely satisfactory. Thus, although various attempts have so far been made to manufacture pressure-sensitive adhesive compositions using a low molecular weight liquid rubber or a derivative thereof, for instance, such compositions have proved still unsatisfactory, apparently due to the fact that the liquid rubber is based on butadiene, that its molecular weight is too low, i.e., a few thousand at the maximum, and that the distribution of functional groups within the molecular chain is not appropriate.

SUMMARY OF THE INVENTION

The primary object of this invention is to provide a pressure-sensitive adhesive composition suited for the fabrication of various pressure-sensitive adhesive tapes, labels and other products having very desirable performance characteristics.

A further object is to provide such an adhesive composition by a manufacturing process involving an ingenious employment of a low molecular weight polyisoprene having a defined structure and without use of any organic solvent or with use of a very sparing amount of such a solvent, that is to say, with the solids content of the system being maintained at extremely high levels throughout the entire manufacturing process.

Briefly, these objects and other objects of the invention as hereinafter will become more readily apparent can be obtained by providing a pressure-sensitive adhesive composition which comprises a liquid rubber component which is a modified low molecular weight polyisoprene, which is obtainable by forming an adduct of a low molecular weight polyisoprene having a molecular weight in the range of 10,000 to 90,000 with 0.03 to 7 mol % of maleic anhydride and/or a derivative thereof per isoprene monomer unit, a cross-linking agent therefor and a tackifier.

BRIEF DESCRIPTION OF THE INVENTION

In the first place, the unmodified low molecular weight polyisoprene, the precursor of said modified low molecular weight polyisoprene which is employed according to this invention, should essentially have a molecular weight in the range of 10,000 to 90,000 and, preferably, in the range of 20,000 to 60,000. The performance characteristics (tackiness, cohesive force, etc.) desired in the final pressure-sensitive adhesive composition cannot be obtained if the molecular weight of the polyisoprene is less than the lower limit of the above-mentioned range, while no adequate tackiness will be obtained if the molecular weight is higher than the above-mentioned upper limit, not to speak of the resultant unduly increased viscosity of the composition which causes problems in processing.

It should be understood that the term "molecular weight" is herein used to denote the viscosity average molcular weight (M) which can be calculated from the inherent viscosity $[\eta]$ in toluene solution at 30° C., by means of the following equation:

$$[\eta] = 1.21 \times 10_{-4} M^{0.77}$$

The low molecular weight polyisoprene whose molecular weight lies within the above-mentioned range can be prepared by polymerization, such as anionic polymerization, radical polymerization, coordinate anionic polymerization or the like. It is also obtainable by the thermal decomposition at an elevated temperature (e.g. 180°–300° C.) of natural rubber or a solid synthetic cis-1,4-polyisoprene rubber which has been prepared by Ziegler type polymerization or anionic polymerization. However, the low molecular weight polyisoprene obtained by thermal decomposition is undesirable in that it has an intense odor attributable to the byproducts of thermal decomposition and has been severely discolored for the same reason. For the purpose of this invention, the low molecular weight polyisoprene with a high cis 1,4-content (wherein the cis-1,4-structure accounts for at least 75%) which is obtainable by anionic polymerization in the presence of a lithium based catalyst and free from gelation in the course of polymerization is most desirable. Therefore, the anionic polymerization process for producing such a low molecular weight polyisoprene will be now described. Thus, with the aid of a catalyst such as lithium metal or an organolithium compound such as methyllithium, propyllithium, butyllithium or distyrenyllithium, isoprene monomer is polymerized in the presence or absence of a solvent. A process of this type is disclosed, for example in British Pat. No. 990,439. As is well known, the molecular weight of such a polyisoprene can be easily controlled by adjusting the ratio of isoprene monomer and catalyst. The use of a polymerization solvent facilitates control of the polymerization reaction and is generally advisable.

As examples of the derivative of maleic anhydride employed for the production of said modified low molecular weight polyisoprene, there may be mentioned the mono-esters of maleic anhydride or maleic acid with alcohols (i.e., monomaleates), the corresponding di-esters (i.e., dimaleates), amides obtainable by amidation of maleic anhydride or maleic acid with ammonia or an amine (i.e., maleamides) and the corresponding imides (i.e., maleimides).

The addition reaction of maleic anhydride or a derivative thereof to the low molecular weight polyisoprene can be easily accomplished by adding maleic anhydride or its derivative to a low molecular weight polyisoprene having a molecular weight in the defined range and heating the mixture in the presence or absence of a solvent and in the presence or absence of a radical catalyst. As far as solid polyisoprene is concerned, such a reaction is known from the disclosure in U.S. Pat. No. 3,887,527, for instance. The solvent for this purpose may generally be a hydrocarbon solvent or a halogenated hydrocarbon solvent. Particularly an inert hydrocarbon solvent such as n-butane, n-hexane, n-heptane, cyclohexane, benzene, toluene or xylene is preferred.

The modified low molecular weight polyisoprene includes the adducts of maleic anhydride or its derivatives which are obtainable by reacting a low molecular weight polyisoprene with maleic anhydride and/or a derivative of maleic anhydride (such as maleic acid, maleic acid ester, maleamide, maleimide), and the corresponding adducts wherein one or both of the carboxyl groups derived from maleic anhydride have been esterified in the presence or absence of a catalyst such as p-toluenesulfonic acid, amidated or imidated by reacting said adducts with an alcohol, e.g., methanol, ethanol or n-propanol, ammonia or an amine, e.g., n-propylamine or n-butylamine. In view of the viscosity stability during prolonged storage of the modified low molecular weight polyisoprene, the modified polyisoprene transformed into an alcohol ester or amine derivative is preferred to the simple adduct.

The content of maleic anhydride or its derivatives in the modified low molecular weight polyisoprene influences the performance characteristics of the final pressure-sensitive adhesive composition and, based on the isoprene monomer in the low molecular weight polyisoprene, is preferably within the range of 0.03 to 7 mole percent and, for still better results, within the range of 0.1 to 4 mole percent. No desirable performance can be obtained in the final pressure-sensitive adhesive composition if the level of addition should be in excess of or below the above-mentioned range. Thus, if the level of addition of maleic anhydride or its derivatives is too low, the composition will be unsatisfactory in cohesive force (creep) and tackiness. If, conversely, the level is too high, the composition will not only be unsatisfactory in tackiness and adhesive force but is liable to form a gel before it is applied to a backing material, thus interfering significantly with processing. The level of addition of the polar groups can be ascertained by infrared absorption spectrometry.

The cross-linking agent for the modified liquid polyisoprene, which is to be employed according to this invention, is one or more members selected from the class consisting of metallic, amine-type, epoxy-type, glycol-type and isocyanate-type cross-linking agents. The metallic cross-linking agents are compounds of the metals of Group I, Group II or Group IV of the Periodic Table of the Elements, such as sodium acetate, lithium hydroxide, potassium nitrate, sodium carbonate, zinc oxide (zinc white), magnesium oxide, lead oxide, calcium hydroxide, zinc acetate, calcium acetate, zinc resinate, sodium resinate, etc. As examples of the amine-type cross-linking agents there may be mentioned diethylenetriamine, triethylenetetramine, diaminodiphenylmethane, polyethyleneimine and polyamide resins. Typical examples of said epoxy-type cross-linking agents include the epoxy resin obtainable by condensation of bisphenol A and epichlorohydrin, the epoxide equivalent of which is preferably in the range of about 150 to 700. As examples of the glycol-type cross-linking agent there may be mentioned polyoxyethylene glycol, polyoxypropylene glycol, etc. and the corresponding esters. The isocyanate-type cross-linking agents are compounds containing at least two isocyanate groups per molecule, such as tolylene diisocyanate, phenylene diisocyanate, diphenylmethane diisocyanate, tris(p-isocyanatophenyl)thiophosphate, triphenylmethane 4,4',4''-triisocyanate, etc. Of these cross-linking agents, the most desirable agents are metallic, amine-type and epoxy-type cross-linking agents. While the proper amount of cross-linking agent varies with different types of agents, temperatures and other factors, it is about 0.1 to 200 weight parts based on every 100 weight parts of the modified low molecular weight polyisoprene. Taking zinc oxide (zinc white) as an example, it is employed in a proportion of at least 0.1 equivalent, preferably at least 0.5 equivalent, based on the added maleic anhydride. However, since zinc oxide is a filler as well, its amount may normally be about 100 weight parts per 100 weight parts of modified liquid polyisoprene.

Without the tackifier, another essential component, no adequate tackiness and adhesive force can be realized in the final pressure-sensitive adhesive composition. As examples of such tackifiers, there may be mentioned polyterpene resins, aromatic hydrocarbon resins, aliphatic hydrocarbon resins, alicyclic hydrocarbon resins, coumarone-indene resins, rosin-type resins and phenolic resins. These resins are employed alone or as a mixture. The proper amount of such resin is 5 to 250 weight parts, preferably 10 to 50 weight parts, based on 100 weight parts of modified low molecular weight polyisoprene. The desired degree of tackiness cannot be obtained when the amount of tackifier produces inadequate cohesive properties.

In addition to the above-mentioned modified low molecular weight polyisoprene, cross-linking agent therefor and tackifier, there also may be incorporated into the pressure-sensitive adhesive composition other additives such as fillers, antioxidants, softeners, etc. In some applications, unmodified low molecular weight polyisoprene, other modified low molecular weight polyisoprenes and liquid polymers other than polyisoprene may also be incorporated in minor amounts.

The pressure-sensitive adhesive composition of this invention can be produced, for example by the following procedures. The modified low molecular weight polyisoprene, tackifier, cross-linking agent and other components may all be admixed together at a suitable temperature in a single operation. A procedure generally desirable for a good control of the cross-linking reaction, however, comprises adding the cross-linking agent to a mixture of modified low molecular weight polyisoprene, tackifier and other components. An alternative procedure, also preferred from the same point of view, comprises preparing a first composition based on the modified low molecular weight polyisoprene and a second component based on the cross-linking agent independently and admixing the two compositions at the time when the backing member is coated with the adhesive system. The coating operation is carried out at a suitable temperature according to the softening point of the tackifier, the viscosity of the modified low molecular weight polyisoprene and the viscosity of the mixture. To increase the velocity of the cross-linking reaction after coating of the backing member therewith, a heat treatment at an appropriate temperature (e.g. 70°–115° C.) is carried out at times. While it is most desirable not to employ a solvent at all in such a mixture, a small amount of solvent may be employed in certain instances. The mixing of the components may be carried out by means of a mixing vessel with an agitator, internal mixer, Banbury mixer or open roll, for instance.

As typical examples of the products obtainable with the pressure-sensitive adhesive composition of this invention, there may be mentioned kraft tape, cellophane tape, fabric tape, paper tape, film tape and other so-called tape glues, and plasters. The pressure-sensitive adhesive composition of this invention may be successfully utilized also as an adhesive agent without the aid of any backing material.

Having generally described this invention, a further understanding can be obtained by reference to certain specific examples which are provided herein for purposes of illustration only and are not intended to be limiting unless otherwise specified.

EXAMPLE 1

Three kinds of polyisoprene with molecular weights of 5,200, 31,000 and 152,000, respectively, were prepared by polymerizing monomeric isoprene in n-heptane solvent with the use of a lithium catalyst. A 50% toluene solution of each polyisoprene was prepared, 5 parts by weight of maleic anhydride per 100 parts by weight of the polyisoprene was added, and the reaction was allowed to proceed with heating at a temperature of 160° C. with stirring for 5 hours. The reaction mixture was poured into acetone, and the precipitate was separated and dried. For each modified polyisoprene, the amount of bound maleic anhydride was about 0.4 mol %.

Composition A as shown in Table 1 was prepared in a mixing vessel equipped with a stirrer and kept at a temperature of 40° C., while Composition B as shown in Table 1 was prepared in a mixing vessel equipped with a stirrer and maintained at a temperature of 170° C. Both the compositions A and B were then blended, and while the temperature of the resulting mixture was kept at 40° C., the mixture, i.e., the adhesive composition, was applied to a polyester film. With the modified polyisoprene derived from the low molecular weight polyisoprenes with molecular weights of 5,200 and 31,000, respectively, no problems arose in the above operation. With the one from the polyisoprene having a molecular weight of 152,000, however, the above operation could not be carried out due to the extremely high viscosity of the composition.

Table 1

| Composition A | Modified polyisoprene | 100 (Parts by weight) |
|---|---|---|
| | Antioxidant "Nocrac NS-6"[1] | 1 |
| Composition B | Tackifier "YSPX 1000"[2] | 13 |
| | Tackifier "Zinc Resin"[3] | 40 |
| | Crosslinking agent (zinc white) | 5 |
| | Antioxidant "Nocrac NS-6"[1] | 1 |

Notes:
[1]2,2'-Methylenebis(4-methyl-6-tert-butylphenol) (Ouchi-Shinko Chemical Industries Co., Ltd.)
[2]Polyterpene resin (Yasuhara Yushi Kogyo Co., Ltd.)
[3]Zinc resinate (Arakawa Forest Chemical Industries, Ltd.)

The coated films were heated at 120° C. for 10 minutes, and then stored at room temperature. After 5 days or one month storage, the performance characteristics of each adhesive-coated film were evaluated and compared with those of typical, commercially available adhesive-coated tapes. As the results shown in Table 2 indicate, the performance of the adhesive composition prepared from the modified polyisoprene with the original molecular weight of 5,200 was poor and could not reach the performance level of the adhesive compositions used in the commercially available adhesive-coated tapes. On the contrary, the pressure-sensitive adhesive composition of the present invention containing the modified low molecular weight polyisoprene with the original molecular weight of 31,000 was at least comparable in adhesive performance to the commercially available pressure-sensitive adhesive compositions. Moreover, the composition of the invention showed little difference between its performance characteristics after 5 days storage and those after one month storage. This fact indicates the stability of said composition.

Table 2

| Average mol. wt. of polyisoprene before modification. | Tackiness[1] Ball tack No. After | | Cohesive force (40° C.)[2] Falling time After | | Adhesiveness[3] g/cm After | |
|---|---|---|---|---|---|---|
| | 5 days | 1 month | 5 days | 1 month | 5 days | 1 month |
| 5,200 | 7 | 6 | 0 | 0 | 58 | 47 |
| 31,000 | 24 | 24 | 12 | 10 | 800 | 876 |
| Commercial adhesive-coated tapes, etc. | | | | | | |
| Cellophane Tape A | 21 | | 2 | | 336 | |
| Cellophane Tape B | 18 | | 17 | | 229 | |
| Kraft paper tape | 21 | | 6 | | 243 | |
| Poly(vinyl chloride) tape | 10 | | 8 | | 127 | |
| Japanese paper tape | 18 | | 0.2 | | 340 | |
| Label | 12 | | 0.5 | | 238 | |

Notes:
[1]Tackiness (Tack): According to J. Dow type ball tack measurement method. The greater the ball number, the greater is the tackiness.
[2]Cohesive force (Creep resistance): The period of time after which an adhesive-coated tape test piece, bonded by its 15 mm × 12 mm surface portion to a stainless steel sheet and kept under a load of 1 kg over said period, falls off.
[3]Adhesiveness: The stress measured when an adhesive-coated tape piece bonded to a stainless steel sheet is peeled off from said steel sheet at a separation angle of 180 deg. and at a separation rate of 30 cm per min.

EXAMPLE 2

A low molecular weight polyisoprene with a molecular weight of 42,000 was prepared in a manner similar to that described in Example 1. Four 70% solutions of said polyisoprene in heptane were prepared, maleic anhydride was added to each in the amounts specified in Table 3 respectively, and the mixtures were stirred at 140° C. for 7 hours, to yield modified low molecular weight polyisoprenes with bound maleic anhydride contents of 0.01, 0.5, 2.1 and 10.1 mol %, respectively. Each of these was heated in an excess amount of methanol at 60° C. to esterify the bound maleic anhydride. Using the esterified, modified, low molecular weight polyisoprenes, pressure-sensitive adhesive compositions were prepared in accordance with the recipes and the procedure described in Example 1. The performance characteristics of the adhesive compositions 10 days after the preparation were as shown in Table 3. As can be seen from Table 3, an insufficient content of the maleic anhydride derivative (i.e., ester) results in unsatisfactory cohesive force, whereas excessive content of said derivative results in insufficient tackiness and adhesiveness.

Table 3

| Amount of bound maleic anhydride derivative[mol %] | Tackiness Tack ball [No.] | Cohesive force Falling time (min.) | Adhesiveness (g/cm) |
| --- | --- | --- | --- |
| 0.01 | 10 | 0 | 180 |
| 0.5 | 19 | 16 | 729 |
| 2.1 | 16 | 63 | 520 |
| 10.1 | 1 | >120 | 105 |

EXAMPLE 3

Gaseous ammonia was passed through the maleic anhydride modified polyisoprene with a maleic anhydride content of 2.1 mol % as prepared in Example 2, to give a modified low molecular weight polyisoprene that contained maleic amides bound thereto.

Table 4

| Composition A | Modified low molecular weight polyisoprene | 100 (parts by weight) |
| --- | --- | --- |
| | Antioxidant "Antigene WX"[1] | 0.5 |
| Composition B | Tackifier "Akron P 100"[2] | 30 |
| | Tackifier "Petrosin 100"[3] | 10 |
| | Crosslinking agent (zinc acetate) | 10 |
| | Antioxidant "Nocrac NS-6" | 2 |

Notes:
[1]4,4'-Thiobis(6-tert-butyl-3-methylphenol)(Sumitomo Chemical Co., Ltd.)
[2]Alicyclic hydrocarbon resin (Arakawa Forest Chemical Industries, Ltd.)
[3]Aromatic hydrocarbon resin (Mitsui Petrochemical Industries, Ltd.)

Composition A as shown in Table 4 was prepared at 50° C., and Composition B as shown in Table 4 was prepared separately at 150° C. Immediately after mixing both the compositions, the mixture (i.e., the adhesive composition) was applied at a temperature of 70° C. to a polyester film. The coated film was heated at 120° C. for 10 minutes allowed to stand at room temperature for 10 days, and then tested for performance.

The tackiness of the pressure-sensitive adhesive composition showed a tack ball number of 15, a cohesive force at 40° C. expressed in terms of a falling time of 7 minutes and an adhesiveness of 350 g/cm. These values are quite satisfactory for use as a pressure-sensitive adhesive composition.

EXAMPLE 4

A low molecular weight polyisoprene with a molecular weight of 56,000 was prepared in a manner similar to that described above.

Said polyisoprene was heated at 180° C. with stirring, and maleic anhydride was added thereto in the form of a powder in an amount of 6 parts by weight per 100 parts by weight of said polyisoprene, and the reaction was allowed to proceed for 5 hours, to give a modified low molecular weight polyisoprene whose bound maleic anhydride content was 0.71 mol %.

Table 5

| Composition A | Modified low molecular weight polyisoprene | 100 (Parts by weight) |
| --- | --- | --- |
| | Naphthene oil[1] | 10 |
| | Antioxidant "Nocrac NS-6" | 1 |
| Composition B | Tackifier "YSPX 1150"[2] | 30 |
| | Crosslinking agent | 10 |
| | Crosslinking agent (triethylenetetramine) | 1 |
| | Antioxidant "Nocrac NS-6" | 1 |
| | Tolune | 10 |

Notes:
[1]Sunthene 450 (Sun Oil Company)
[2]Polyterpene resin (Yasuhara Yushi Kogyo Co., Ltd.)
[3]Epoxy resin GY-260 (Ciba-Geigy A.-G.)

Compositions A and B as shown in Table 5 were prepared at room temperature separately. Immediately after mixing both the compositions, the mixture was appled to a cellophane sheet, and the coated sheet was dried, heated at 100° C. for 30 minutes, stored for 10 days, and then tested.

The above pressure-sensitive adhesive composition showed such excellent characteristics as a ball tack number of 28, a falling time (cohesive force) of one minute and an adhesiveness of 660 g/cm.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A pressure-sensitive adhesive composition comprising a liquid rubber, a crosslinking agent therefor and a tackifier, said liquid rubber being a modified low molecular weight polyisoprene which is an adduct of a low molecular weight polyisoprene having a molecular weight of 10,000 to 90,000 with maleic anhydride and/or a derivative thereof in an amount of 0.03 to 7 mol % per isoprene monomer unit is said low molecular weight polyisoprene.

2. The pressure-sensitive adhesive composition of claim 1, wherein said low molecular weight polyisoprene is a polymer prepared by polymerization of momomeric isoprene in the presence of a lithium catalyst.

3. The pressure sensitive adhesive composition of claim 1, wherein said crosslinking agent is at least one member selected from the group consisting of a metal compound, an amine, an epoxide, a glycol and an isocyanate.

4. The pressure-sensitive adhesive composition of claim 3, wherein said metal compound crosslinking agent is a compound of a metal of Group I, Group II or Group IV of the periodic table.

5. The pressure-sensitive adhesive composition of claim 4, wherein said compound is selected from the group consisting of sodium acetate, lithium hydroxide, potassium nitrate, sodium carbonate, zinc oxide, magnesium oxide, lead oxide, calcium hydroxide, zinc acetate, calcium acetate, zinc resinate and sodium resinate.

6. The pressure-sensitive adhesive composition of claim 3, wherein said amine crosslinking agent is selected from the group consisting of diethylenetriamine, triethylenetetramine, diaminodiphenylmethane, polyethyleneimine and polyamide resins.

7. The pressure-sensitive adhesive composition of claim 3, wherein said epoxide crosslinking agent is an epoxy resin having an epoxide equivalent of 150 to 700 prepared by condensation of bisphenol A and epichlorohydrin.

8. The pressure-sensitive adhesive composition of claim 3, wherein said glycol crosslinking agent is selected from the group consisting of polyoxyethylene glycol, polyoxypropylene glycol, and esters thereof.

9. The pressure-sensitive adhesive composition of claim 3, wherein said isocyanate crosslinking agent is selected from the group consisting of tolylene diisocyanate, phenylene diisocyanate, diphenylmethanediisocyanate, tris(p-isocyanatophenyl)thiophosphate and triphenylmethane-4,4',4",-triisocyanate.

10. The pressure-sensitive adhesive composition of claim 1, wherein said tackifier is at least one resin selected from the group consisting of polyterpene resins, aromatic hydrocarbon resins, aliphatic hydrocarbon resins, alicyclic hydrocarbon resins, coumarone-indene resins, rosin-type resins and phenol resins.

11. The pressure-sensitive adhesive composition of any one of claims 1-10, wherein the amounts of said crosslinking agent and said tackifier are 0.1 to 200 parts by weight and 10 to 250 parts by weight, respectively, per 100 parts by weight of said liquid rubber.

* * * * *